United States Patent [15] 3,674,278
Bowerman [45] July 4, 1972

[54] COMPENSATED PHONOGRAPH TURNTABLE

[72] Inventor: William R. Bowerman, 2457 Jasu Drive, Lawrence, Kans. 66044

[22] Filed: Dec. 21, 1970

[21] Appl. No.: 99,995

[52] U.S. Cl. .......................... 274/39 A
[51] Int. Cl. .......................... G11b 3/60
[58] Field of Search .......................... 274/39 R, 39 A, 9, 2; 308/9

[56] References Cited

UNITED STATES PATENTS 3,103,364 9/1963 Macks et al. .......................... 274/39
2,695,198 11/1954 Brugger .......................... 308/9

*Primary Examiner*—Leonard Forman
*Assistant Examiner*—Charles E. Phillips
*Attorney*—Morse, Altman & Oates

[57] ABSTRACT

A self-compensating, balanced turntable is provided for record players to maintain the turntable in a true horizontal plane. A turntable-tone arm assembly is formed with a hemispherical lower portion disposed in a matching hemispherical cavity formed in a fixed base. Air under low pressure is delivered between the base cavity and the hemispherical portion to form an air bearing therebetween. The table-tone arm assembly is weighted in such a fashion that the turntable surface will assume a horizontal attitude regardless of the attitude of the base. In a modification an anti-skating control is provided to move the centering weight automatically to compensate for imperfections in record playback using a conventional tone arm.

4 Claims, 4 Drawing Figures

INVENTOR
WILLIAM R. BOWERMAN
BY Morse, Altman & Oates
ATTORNEYS

COMPENSATED PHONOGRAPH TURNTABLE

BACKGROUND OF THE INVENTION

1. Field of the Invention

This invention relates generally to phonograph equipment and more particularly is directed towards a new and improved compensated turntable and tone arm assembly.

2. Description of the Prior Art

Conventional record turntables normally are supported on some sort of base through a spring-mounting arrangement. This use of spring-mounting while protecting the turntable from shocks and vibrations external to the instrument, make no corrections for tilting and care must be taken, particularly with very sensitive equipment, to insure that the turntable is perfectly level and remains so in order to achieve optimum performance.

Accordingly, it is a general object of the present invention to provide improvements in phonograph turntables and more particularly to provide a self-leveling, shock-protected turntable for records. Another object of this invention is to provide an antiskating control for record players.

SUMMARY OF THE INVENTION

This invention features a phonograph turntable, comprising a relatively fixed base formed with a hemispherical cavity in its upper surface, a turntable-tone arm assembly formed with a hemispherical lower portion adapted to fit within the base cavity and means for delivering air under pressure between the cooperating hemispherical faces to form an air bearing supporting the turntable-tone arm assembly. The turntable-tone arm assembly is weighted in such a fashion that the plane of the turntable will remain horizontal regardless of the attitude of the base. In a modification of the invention, a control arrangement is provided moving the center of gravity of the turntable-tone arm assembly to prevent skating of the tone arm over the record.

DETAILED DESCRIPTION OF THE PREFERRED EMBODIMENTS

Figures 1, 2, 3, 4:
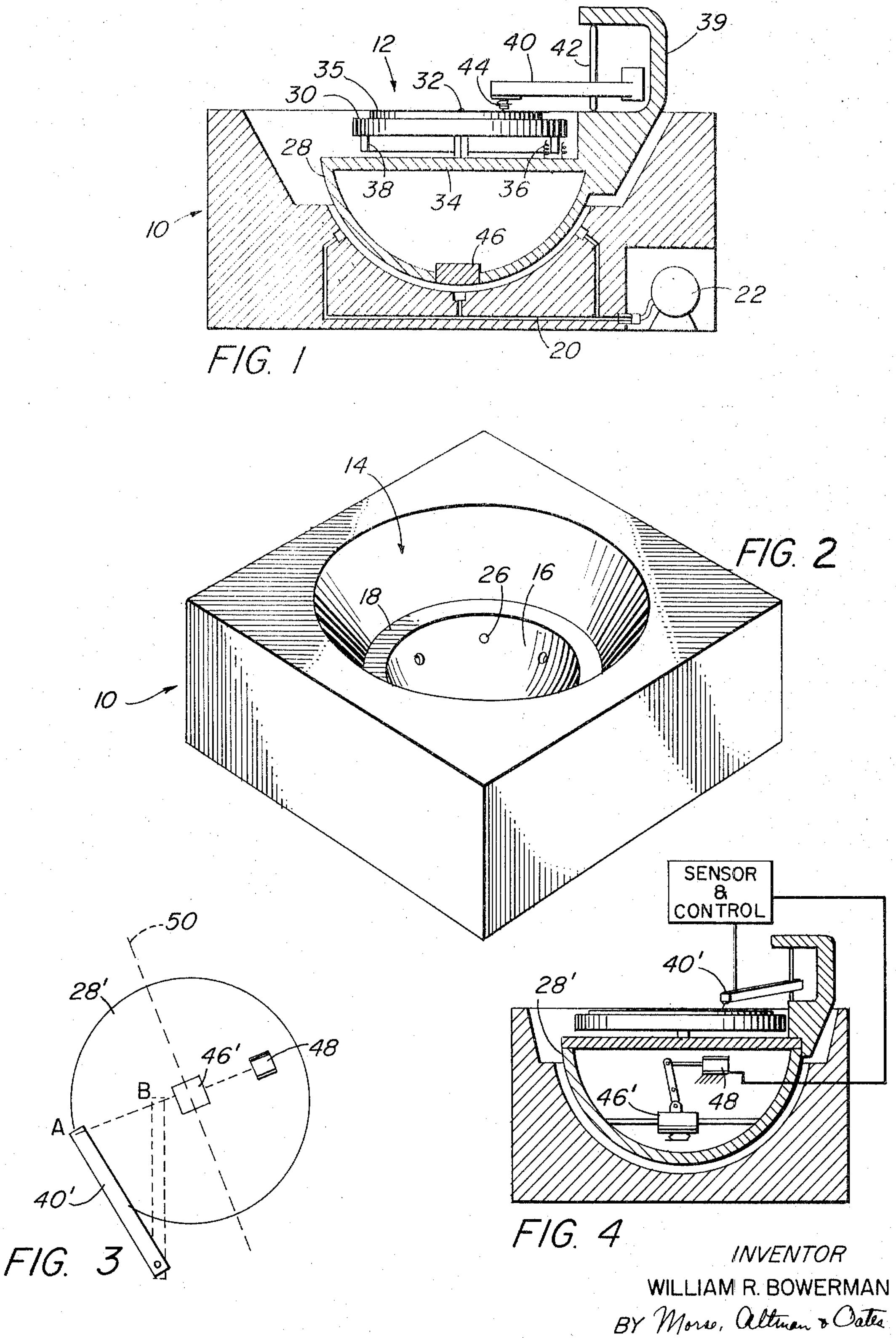
FIG. 1 is a sectional view in side elevation of a compensated turntable made according to the invention.
FIG. 2 is a view in perspective of the base portion.
FIG. 3 is a top plan view somewhat schematic showing a modification of the invention, and, FIG. 4 is a sectional view in side elevation of the FIG. 3 device.

Referring now to the drawings and to FIGS. 1 and 2 in particular, the phonograph is generally organized about a relatively fixed base 10 supporting a relatively movable turntable-tone arm assembly 12. The base 10, in the illustrated embodiment, is rectangular in configuration although the external shape is not pertinent to the invention. In any event, the base 10 in its upper face is formed with a cavity 14 and at least the lower portion 16 of which is hemispherical and may be formed with an annular shoulder 18 to define the limits of an air bearing to be described below. The base 10 is provided with one or more conduits 20 which may be internal passages or tubes connected at one end to a source of compressed air, as a pump 22, and terminating at the other end in one or more outlet ports 26, preferably evenly distributed about the concave portion 16 to direct a flow of compressed air radially inward towards a convex hemispherical hub 28 forming a lower portion of the turntable-tone arm assembly 12. The hemispherical hub 28 conforms in contour to the hemispherical cavity 16 being slightly spaced from it when the air is delivered between the two opposing surfaces to form an air-bearing.

The assembly 12 includes a turntable 30 rotatably mounted about a vertical axis by means of a spindle 32 carried by a flat upper wall 34 of the hub 28. The table 30 supports a phonograph record 35 and is driven in the illustrated embodiment by means of a linear induction motor comprised of coils 36 mounted to the wall 34 adjacent an annular conductive flange 38 depending from the lower face of the table 30.

Extending upwardly from one side of the hub 28 is a bracket 39 pivotally supporting a tone arm 40 as by means of a vertical post 42. The tone arm assembly can be of a conventional configuration or may be made in accordance with the tone arm disclosed in applicant's co-pending application entitled "Tone Arm For Record Turntable," filed Dec. 21, 1970 Ser. No. 100036 . In the tone arm of the co-pending application a retractable tip 44 is provided whereby movement of the tone arm is limited to the horizontal plane, the tip being extended and retracted at the beginning and ending respectively of each operation.

At the lower portion of the hub 28 a weight 46 is provided in a position which locates the center of gravity of the assembly 12 so as to maintain the upper surface of the table 30 in a true horizontal plane regardless of the attitude of the base 10. Thus, if the base 10 were tilted at a slight angle because of the unevenness of a desk, floor or whatever else may be supporting the base, the turntable 30 will automatically assume a position in the true horizontal plane since the hub is free to move in the cavity by reason of its hemispherical configuration and by reason of the free-floating air bearing arrangement. The air bearing has the further advantage of insulating the assembly from shock, vibrations or the like which might interfere with the performance of the equipment. The use of a linear induction motor also enhances performance since it substantially eliminates background rumbling often encountered with conventional type drives and has a minimum number of parts.

Referring now to FIGS. 3 and 4 of the drawings, there is illustrated a modification of the invention and in this embodiment a weight 46′ disposed at the lower portion of a hub 28′ similar to the hub 28 of the principal embodiment, is movable along a radial line by means of a variable power solenoid 48 operatively connected to the weight, the solenoid being fixed to the hub 28′.

The function of the movable weight is to provide an anti-skating control for the record player and serves to counter the imperfection in record playback created with a conventional pivoted tone arm. Conventional anti-skating techniques involve the application of a slight lateral pressure on the needle to enhance fidelity. The amount and direction of pressure applied in an attempt to compensate for inaccuracies introduced by using a pivoted needle arm to track a signal produced by a radially moving recording device are constantly changing as a record is played. Conventional anti-skating mechanisms are complex, delicate, expensive and relatively fragile. Precisely the same anti-skating effect can be achieved with none of these disadvantages by using the movable weight. With the use of the adjustable weight 46′, corrective pressure is achieved by tilting the turntable and tone arm so that a free-swinging arm 40′ is pushed slightly one way or the other exerting the appropriate pressure to correct for the tracking problem.

The technique of tilting the turntable and arm is to shift the center of gravity of the hub 28′, along a line which is perpendicular to a line tangent to the record groove at a point on the groove where the needle makes contact. More specifically, the path of the movable weight is parallel to a straight line passing through points A and B in FIG. 3 where A is the outermost point on the record where the needle is in contact with the groove and B is the innermost point on the record where the needle is in contact with the grooves. This shift can be produced by attaching the weight 46′ which controls the center of gravity to a solenoid 48. Controlling instructions to the solenoid can be generated at the interface between the base and the arm assembly so that the arm contact with the base will signal the solenoid as to the extent and direction of movement of the weight. The weight is movable to the left or right as viewed in FIGS. 3 and 4 tilting the hub together with the table, platter and arm about an axis 50 so that the arm will exert no pressure against the groove of the record.

The tone arm for this type of anti-skating device must not be counterbalanced in the normal mode. The tone arm must be balanced so it will be top heavy and swing by gravity when the anti-skating weight is moved.

Having thus described the invention, what I claim and desire to obtain by Letters Patent of the United States is:

1. A phonograph for playing records, comprising
   a. a base formed with an upwardly facing hemispherical cavity,
   b. an assembly formed with a downwardly facing hemispherical portion mating with said cavity located within said cavity,
   c. conduit means for delivering air under pressure into said cavity to form an air bearing,
   d. a turntable mounted to the upper portion said assembly for rotation about a vertical axis extending through the center of said hemispherical portion,
   e. the center of gravity of said assembly being located within said hemispherical portion along said vertical axis and adjacent the intersection of said axis and the arcuate surface of said hemispherical portion thereof to maintain said turntable in a horizontal plane,
   f. a tone arm movably mounted to said assembly, and,
   g. power means for rotating said turntable.

2. A phonograph according to claim 1 wherein said power means includes a linear induction motor.

3. A phonograph according to claim 1 including a weight movably mounted to said assembly and control means responsive to the position of said tone arm for moving said weight along a path perpendicular to a line tangent to a point on said record contacted by said tone arm.

4. A phonograph according to claim 1 wherein said conduit means includes a plurality of air lines terminating in ports evenly distributed about said cavity.

* * * * *